(12) United States Patent
Eskicioglu (10) Patent No.: US 7,200,752 B2
(45) Date of Patent: Apr. 3, 2007

(54) THRESHOLD CRYPTOGRAPHY SCHEME FOR MESSAGE AUTHENTICATION SYSTEMS

(75) Inventor: Ahmet Eskicioglu, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 274 days.

(21) Appl. No.: 09/961,901

(22) Filed: Sep. 24, 2001

(65) Prior Publication Data
US 2002/0087865 A1 Jul. 4, 2002

Related U.S. Application Data

(63) Continuation-in-part of application No. 09/581,064, filed on Oct. 7, 2002.

(60) Provisional application No. 60/253,781, filed on Nov. 29, 2000.

(51) Int. Cl.
*H04L 9/00* (2006.01)
(52) U.S. Cl. .................. 713/181; 713/180; 380/286
(58) Field of Classification Search ............. 380/286, 380/46, 47; 713/166, 180, 181
See application file for complete search history.

(56) References Cited

U.S. PATENT DOCUMENTS 4,797,672 A * 1/1989 Kousa ..................... 340/5.26

6,490,680 B1 * 12/2002 Scheidt et al. ............ 713/166

FOREIGN PATENT DOCUMENTS

WO     WO 00 49756 A    9/2000

OTHER PUBLICATIONS

Shamir, How to Share a Secret, Nov. 1979, ACM, pp. 612-613.*
Simmons, J.D.: "Prepositioned Shared Secret and/or Shared Control Schemes", Eurocrypt '89 Proceedings, Springer-Verlag, 'Online! 1990, p. 437-467, XP002201103.
Menzeles, Oorschot: "Handbook of Applied Cryptography" 1997, CRC Press LLC, USA XP002201106, p. 364, p. 524-527.
Blundo, Cresti, De Santis, Vaccaro: "Fully Dynamic Secret Sharing Schemes" Dipartamento Di Informatica Ed Applicazioni, 'Online! 1994, p. 110-125, XP002201105, Universita di Salerno, Abstract, Chapter 1 and 6.

* cited by examiner

*Primary Examiner*—Gilberto Barron, Jr.
*Assistant Examiner*—Paula Klimach
(74) *Attorney, Agent, or Firm*—Joseph J. Laks; Robert D. Shedd; Paul P. Kiel (57) ABSTRACT

A method and apparatus for authenticating a message, said method including receiving, at a device, data representative of a first share, constructing a key using said first share and at least two additional shares, said at least two additional shares being stored at said device; and authenticating a message using said constructed key.

20 Claims, 9 Drawing Sheets

THRESHOLD CRYPTOGRAPHY SCHEME FOR MESSAGE AUTHENTICATION SYSTEMS

This application claims the benefit of U.S. provisional application Ser. No. 60/253,781 filed Nov. 29, 2000, and is a Continuation-in-Part of co-pending U.S. application Ser. No. 09/581,064 filed Oct. 7, 2002, which are hereby incorporated herein by reference.

FIELD OF THE INVENTION

This invention concerns a system and method for providing message authentication. Utilizing the concept of secret sharing, the system does not require the full keys to be sent to the receiver of the message. Instead, the keys are recovered using at least one share received from the sender and at least two shares stored at the receiver.

BACKGROUND OF THE INVENTION

In modern electronic distribution networks, message authentication is an important objective of information security. This objective is met by providing the receiver of a message an assurance of the sender's identity. As physical protection such as sealed envelopes is not possible for messages expressed as binary sequences, digital tools have been developed using cryptography. A major weakness of all cryptographic methods for message authentication lies in their use of algorithms with fixed symmetric or public keys. We describe a new key transport scheme, based on secret sharing, which allows each new message to be authenticated with a new key, strengthening the system's resistance to attacks on the key or messages.

Authentication is one of the four most important objectives of information security. The others are confidentiality, data integrity and non-repudiation. In communication networks, some or all of these objectives may need to be met.

With respect to confidentiality, it will be noted that there are applications where information should be kept secret. Encryption techniques provide confidentiality by transforming data into unintelligible format. This is a reversible process, and the entity in possession of the right key can recover the data.

With respect to data integrity, users need to have assurance that information has not been altered in an unauthorized way. Hashing functions, which produce compact representations of data, are commonly used for checking data integrity.

Finally, with respect to non-repudiation, when a dispute arises a result of a party in denial of an action, e.g., involvement an electronic transaction, it can be resolved with the participation of a trusted third party acting as a judge.

There are two basic types of authentication: 'entity' authentication and 'message' authentication. Message authentication provides assurance of the identity of the originator of the message. Entity authentication provides assurance of the identity of originator of the message, as well as assurance of the active participation of the originator of the message.

Figure 6:
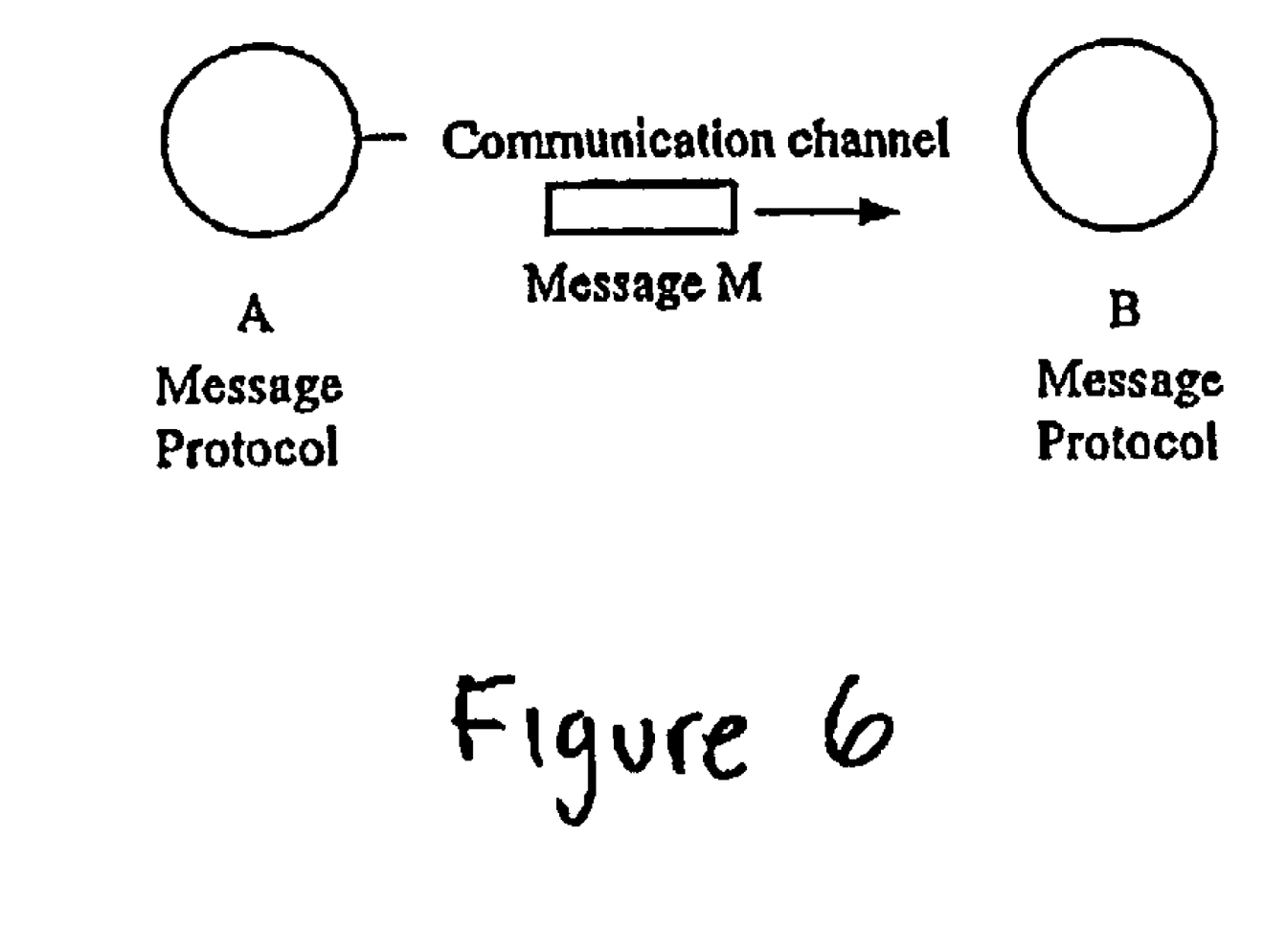
FIG. 6 is a block diagram showing a conventional message authentication system.

FIG. 6 shows a communication channel where two parties (A and B) communicate using a protocol for exchanging messages. Party A is the sender of the message M, and party B is the receiver. Depending upon the type of communication network, party B would like at least three (3) pieces of information on receipt of the message: (1) an assurance of the identity of the party that sent the message M (commonly referred to as 'message' authentication), (2) evidence that the message M was not modified during transmission (data integrity), and (3) an indication that party A (i.e., the sender) was active at the time the message was sent (commonly referred to as 'entity' authentication).

As stated above, message authentication provides assurance of the identity of party A, the originator of the message M. Message authentication also includes evidence of data integrity because if the message M is modified during transmission, party A cannot be the originator. Entity authentication, on the other hand, assures party B of not only the identity of party A, but also his active participation. Sometimes, two parties need to authenticate each other for messages to flow in either direction. Challenge-response protocols based on symmetric or public key schemes, and zero-knowledge protocols are commonly used for mutual authentication.

Although message authentication provides no guarantees of timeliness or uniqueness, it is very useful in communications where one party (e.g., party A) is not active during the execution of the message protocol. To avoid replay attacks (i.e., where a pirate masquerades as party A, and sends a previously used message in an attempt to obtain the protocol), time variant data (e.g., sequence numbers, time stamps, etc.) may be added to the message M.

The cryptographic process known as "hashing" is an essential part of data integrity and message authentication schemes. A hash function takes a message of arbitrary finite length and produces an output of fixed length. In cryptographic applications, the hash value is considered to be a shorter representation of the actual message. Hash functions may be classified into two groups: (1) unkeyed hash functions (i.e., the message is the only input parameter), and (2) keyed hash functions (i.e., the message and a secret key are the input parameters).

A particular class of unkeyed hash functions contains Manipulation Detection Codes (MDCs). MDCs differ in the way in which the message M is compressed. Some examples are: (a) hash functions based on block ciphers, (b) hash functions based on modular arithmetic, and (c) customized hash functions.

The keyed hash functions that are used for message authentication are grouped under Message Authentication Codes (MACs). MACs can be customized, constructed using block ciphers, or derived from MDCs.

Message authentication methods may be classified by how they exploit symmetric or public key ciphers: (a) MACs, (b) message encryption, and (c) digital signatures.

Figure 7:
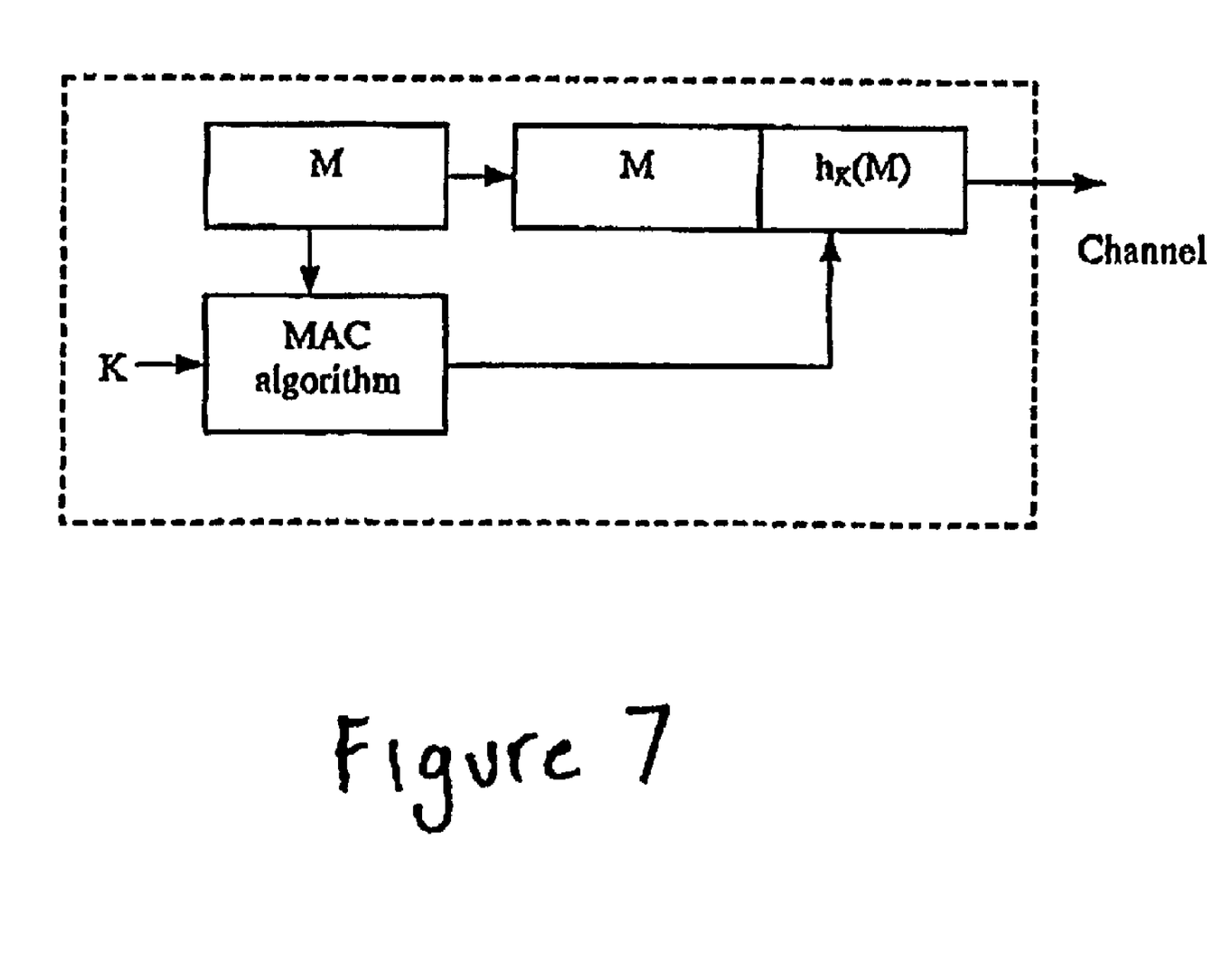
FIG. 7 is a block diagram showing a message authentication system using a MAC.

FIG. 7 shows a block diagram of a message authentication method using a MAC. The message M is input to a MAC algorithm which computes the MAC using a key K which is shared by both parties (i.e., sender (party A) and receiver (party B)). Party A then appends the MAC to the message M, and sends the composite signal to party B.

Figure 8:
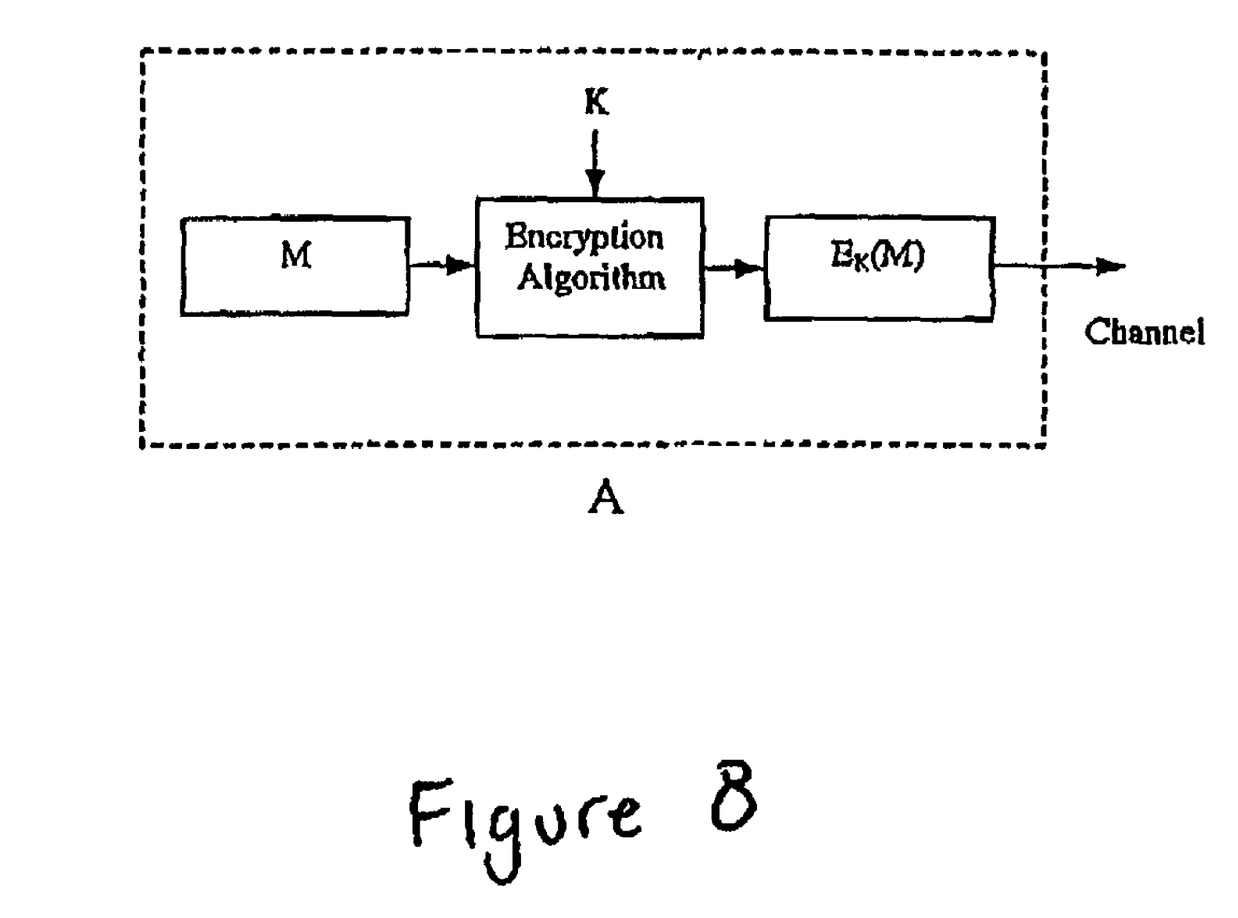
FIG. 8 is a block diagram showing a message authentication system using message encryption.

FIG. 8 shows a block diagram of a message authentication method using message encryption. Message encryption may be accomplished in two ways, symmetric key encryption and public key encryption. With symmetric key encryption, the message M is encrypted with a symmetric key before transmission to the receiver (e.g., party B). The receiver (e.g., party B) uses a copy of the symmetric key to decrypt the message. With public key encryption, the message M is encrypted using a public key and decrypted using the corresponding private key at the receiver. As shown in FIG. 8, under either method, a message M is input to an encryption algorithm which uses a key K (symmetric or public) to create an encrypted message $E_k(M)$.

Figure 9:
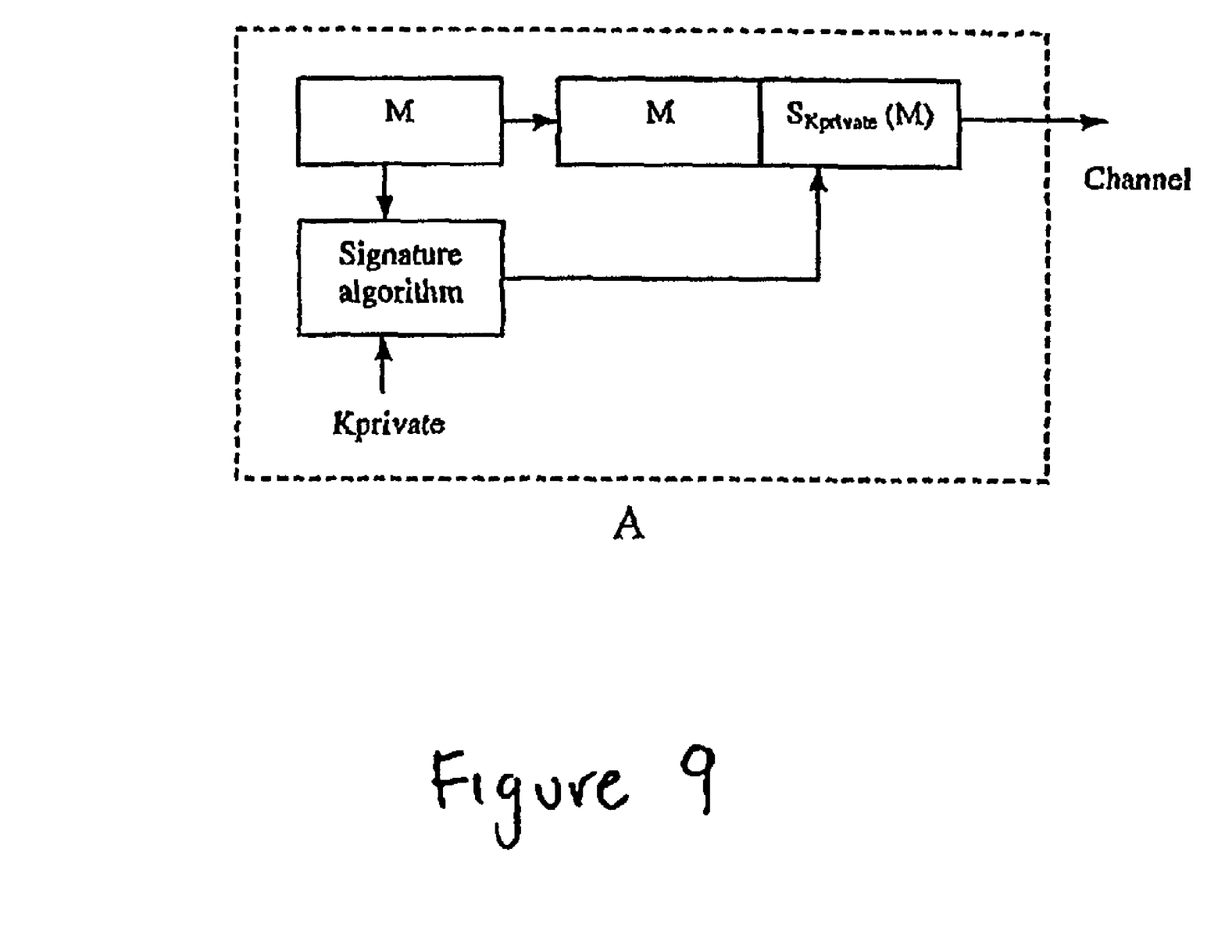
FIG. 9 is a block diagram showing a message authentication system using a digital signature.

FIG. 9 shows a block diagram of a message authentication method using a digital signature. In this method, the sender (e.g., party A) uses a private key ($K_{private}$) to digitally sign the message M. Depending upon the size of the message M, an appropriate signature algorithm may be used. The receiver (e.g., party B) has assurance that the message M was generated by A because A is the only party who owns the private key.

If a fixed key is used for creation of MACs, message encryption and digital message signing (i.e., all three message authentication types), the security level would be limited, thereby exposing the system to cryptanalysis.

With respect to the 'MAC' method, the symmetric key shared by the sender and the receiver needs to used for all messages during its lifetime. This makes this method vulnerable to attacks for key recovery and MAC forgery. There are two possible attacks: (1) attacks on the key space, and (2) attacks on the MAC value. If the pirate can determine the MAC key, he or she would be able to create a MAC value for any message. For a key size of 't' bits and a fixed input, the probability of finding the correct n-bit MAC is about $2^{-t}$. The objective of MAC forgery is to create a MAC for a given message, or to find a message for a given MAC without knowing the key. For an n-bit MAC algorithm, the probability of meeting this objective is about $2^{-n}$. In sum, the effort needed for a brute force attack on a MAC algorithm would be the minimum $(2^t, 2^n)$.

With respect to the message encryption method, this method is also vulnerable to brute force attacks. For example, for a 56-bit DES (symmetric) algorithm, the key may be determined by testing all $2^{55}$ DES operations. More efficient attacks like linear or differential cryptanalysis allow key recovery with less processor time.

With respect to the digital signature method, no public key signature algorithm has been proven secure. The security of public key algorithms is based on the difficulty of computing discrete logarithms, or factoring large numbers. With a fixed public/private key pair, attacks are possible using the public key or signatures on messages. In some applications, the authenticity of the sender's public key is a major problem requiring complex public key infrastructures.

Thus, there is presently a need for a system for providing message authentication which provides a higher degree of security, but which does not used fixed keys.

SUMMARY OF THE INVENTION

The present invention defines a method and apparatus for providing authentication of a message, said method including receiving, at a receiver station, data representative of a first share, constructing a key using said first share and at least two additional shares, said at least two additional shares being stored at said receiver station; and authenticating a message using said constructed key.

In accordance with a first exemplary embodiment of the present invention, first and second shares are used. The first and second shares are points on a Euclidean plane and the step of constructing the key comprises calculating the Y-intercept of the line formed on the Euclidean plane by the first and second shares.

In accordance with a second exemplary embodiment of the present invention, first, second and third shares are used. The first, second and third shares are points on a Euclidean plane and the step of constructing the key comprises calculating the Y-intercept of the parabolic curve formed on the Euclidean plane by the first, second and third shares.

In accordance with a third exemplary embodiment of the present invention, first, second, third and fourth shares are used. The first, second, third and fourth shares are points on a Euclidean plane and the step of constructing the key comprises calculating the Y-intercept of the curve formed on the Euclidean plane by the first, second, third and fourth shares. In general, any number of shares may be used, depending upon the level of security required.

DETAILED DESCRIPTION

The present invention comprises a message authentication system, where messages sent between two or more parties are authenticated using a prepositioned secret sharing scheme. By using a prepositioned secret sharing scheme, the security and flexibility (e.g., by using different keys) of the message authentication system is increased.

The present invention employs an application of a secret sharing scheme, originally developed by Adi Shamir, known as a 'threshold scheme' (See, A. Shamir, "How to share a secret," Communications of the ACM, Vol. 22, No. 11, pp. 612–613, November 1979). An (t,n) threshold scheme, such as the one proposed by Shamir, involves breaking a secret into n pieces (which may be called 'shares' or 'shadows') in such a way that at least t (<=n) of the pieces are required to reconstruct the secret. A perfect threshold scheme is a threshold scheme in which knowledge of (t–1) or fewer pieces ('shares' or 'shadows') provides no information about the secret.

For example, with a (2,5) threshold scheme, the secret is divided into five shares but only two of the shares are required to reconstruct the secret. A (2,5) threshold scheme such as the one described above may be used by a bank manager to divide the combination to the main safe among five tellers. In this way, any two of the tellers working together could open the safe, but one teller alone could not open the safe. In Shamir's (t,n) threshold scheme, choosing a higher value for t, and storing (t−1) secrets in the smart card would increase the system's resistance to ciphertext only attacks, but would lead to more computations for polynomial construction.

Such a threshold scheme reduces the computational requirements in symmetric key recovery. For each new key, only a simple operation is performed (i.e., the value of the polynomial at x=0 is computed), as compared to RSA decryption which involves modular exponentiation. Additionally, security is perfect (i.e., given knowledge of $(x_1, y_1)$, all values of the secret remain equally probable).

The present invention utilizes the principles of Shamir's secret sharing to conceal the identity of a key for authenticating a message. In particular, the present inventor proposes a scheme where the key comprises the Y-intercept of a specific line or curve formed by two or more points on a Euclidean plane.

In the simplest embodiment of this scheme, a device (e.g., receiver) is manufactured with a share or shares already stored therein (this is often referred to as a 'prepositioned' shared secret scheme, as discussed below). This stored share is used to compute the key, which is then used to obtain a message authenticator. The message authenticator may be, for example, of type discussed above with reference to FIG. 7 (e.g., MAC), or may be a different authenticator known to those skilled in the art. When the message signal is transmitted, an additional or 'activating' share is transmitted therewith. It will be noted that the 'activating' share does not need to be encrypted in this scheme, since knowledge of the activating share means nothing without the knowledge of the stored share. On receiving the 'activating' share, the device computes the message authenticator using a key which is computed by finding the Y-intercept of the line formed by the stored share and the 'activating' share. Each time a new key is required, a new 'activating' share may be selected at the transmitter, thereby changing the Y-intercept of the line formed by the stored share and the 'activating' share. In this way, an infinite number of keys may be defined and utilized without changing the device hardware or software. It will be noted that the 'device' described above may comprise many different types of equipment such as analog or digital television receivers, set top boxes, videocassette recorders (VCRs), and other equivalent equipment known to those skilled in the art. For simplicity, the foregoing description will focus on a general "receiver" structure.

The key generation and distribution process may be automated by developing a program to perform the following steps:

(a) Choose a secret S; this will be a value along the Y-axis of a Euclidean plane
(b) Generate a message authenticator using S. This message authenticator may be, for example, a MAC.
(c) Construct a first-degree polynomial f(x) that passes through the point (0, S) and another point $(x_0, y_0)$.
(d) Compute f(x) at $x_1$, where $x_1$ cannot equal $x_0$
(e) Distribute $(x_1, y_1)$ with the message and the message authenticator (e.g., MAC).

Such a scheme as the one described above is often referred to as a 'prepositioned' shared secret scheme because a portion of the secret is 'prepositioned' at the device (e.g., receiver). In the above example, the 'prepositioned' share is the share which is stored at the receiver. Such 'prepositioned' shared secret schemes have been discussed by others in the field of cryptology (See, G. J. Simmons, "How to (really) share a secret," Advances in Cryptology—CRYPTO '88 Proceedings, Springer-Verlag, pp. 390–448, 1990; G. J. Simmons, "Prepositioned shared secret and/or shared control schemes," Advances in Cryptology—EUROCRYPT '89 Proceedings, Springer-Verlag, pp. 436–467, 1990). By prepositioning a certain share or shares, the key can be changed relatively easily without changing any of the circuitry at the receiver; only the 'activating' share need to be changed.

It will be noted that the above algorithm outlines a prepositioned secret sharing scheme which utilizes a secret S with only 2 shares (i.e., 2 points of a line on a Euclidean plane). Of course, other secrets S can be computed from many more shares (points), thereby making cryptanalysis more difficult. The important aspect of a prepositioned secret sharing scheme is that some of the shares are 'prepositioned' at the receiver.

The present invention involves storing at least one of the shares of a secret at a specific location (e.g., in the receiver hardware). The stored share is then used in conjunction with an 'activating' share to construct the secret. In a (4, 4) scheme, for example, preferably three (3) of the four (4) shares are stored at the specific location (e.g., receiver). Then, the last share (also referred to herein as the 'activating' share) is transmitted to the location to obtain the secret. It is important to note that with the present invention, the secret is not the shares themselves, but the Y-intercept of the line or curve (for higher order polynomials) formed by the shares when expressed as points on a Euclidean plane.

Figure 1:
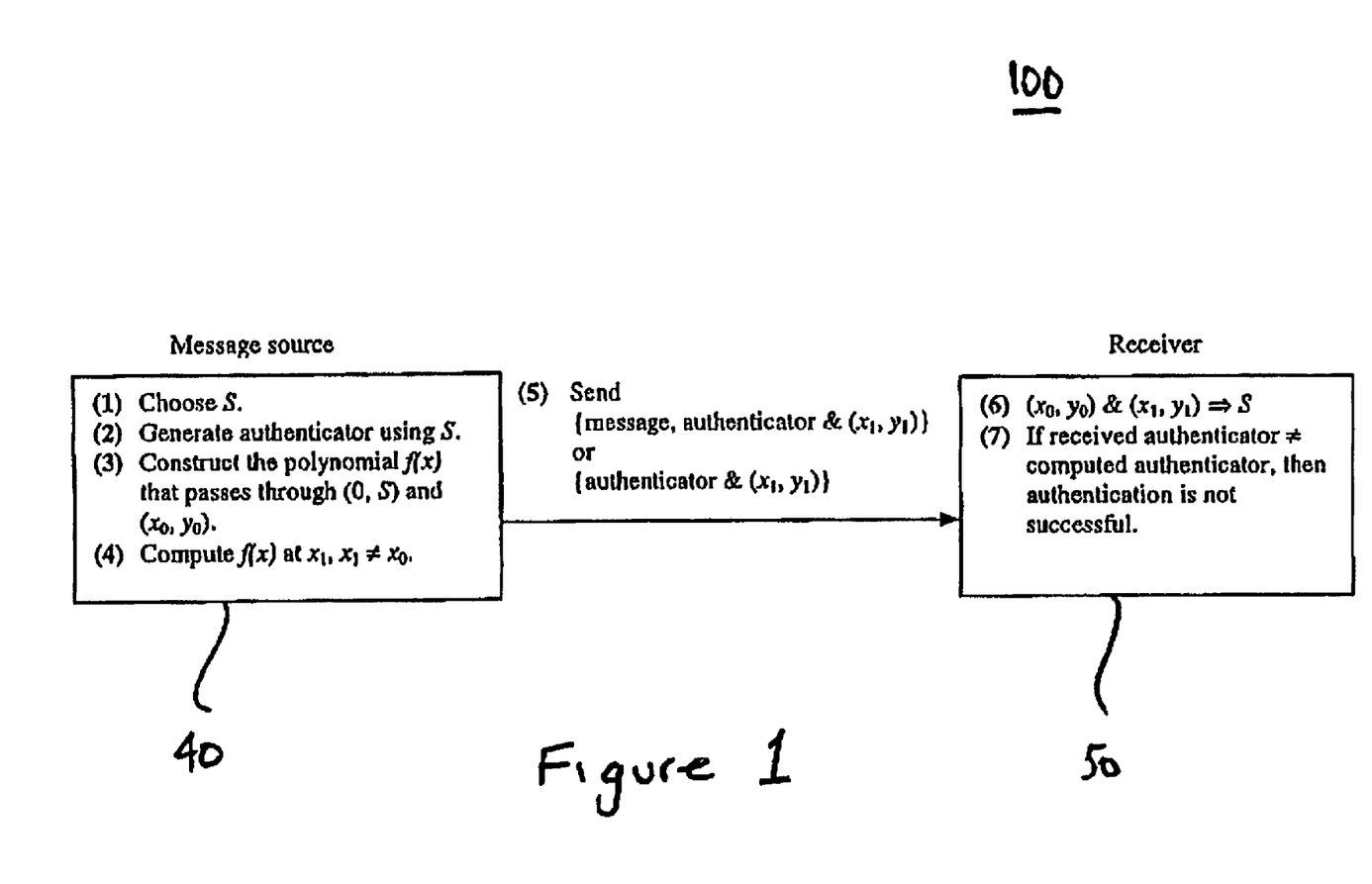
FIG. 1 is a block diagram showing a message authentication system according to a first exemplary embodiment of the present invention.
Figure 2A:
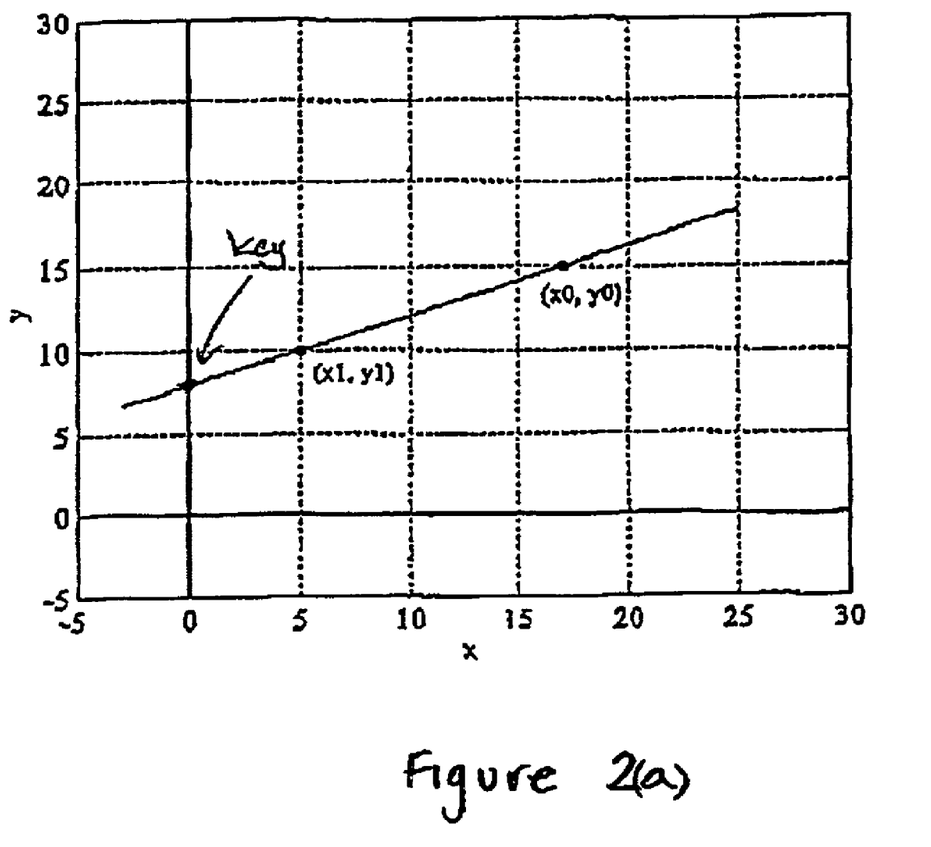
FIG. 2a is a graphical representation of the determination of the authentication key in accordance with a first exemplary embodiment of the present invention.
Figure 2B:
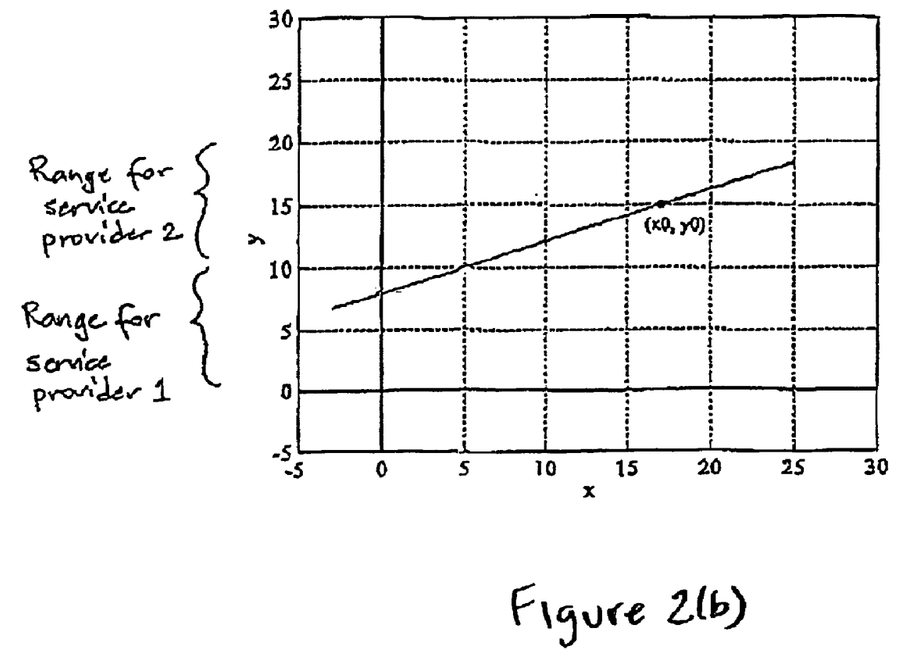
FIG. 2b is a graphical representation of an allocation of a unique and non-overlapping range for each transmitter in accordance with FIG. 1.

FIGS. 1, 2(a) and 2(b) together, demonstrate a message authentication system 100 according to a first exemplary embodiment of the present invention. The message authentication system 100 includes a message source (transmitter) 40 and a message receiver 50. The message source 40 uses a secret key to generate a message authenticator from the message which is typically sent with the message to the receiver 50. The receiver 50 constructs the same key, and uses the key to compute the authenticator. If the authenticator constructed at the receiver and the authenticator sent with the message are the same, the message is determined to be authentic. In the first exemplary embodiment, the secret is obtained from two shares. As noted above, each share is defined by a point on a Euclidean plane.

Particularly, stored in a receiver 50 is a first share (or data point) of the secret. The first share may be thought of as a single point on a Euclidean plane (e.g., in the form of $(x_0, y_0)$). Message source 40 transmits a message with a specific authentication protocol to the receiver 50. In addition to the message, message source 40 transmits the message authenticator and a second (or 'activating') share (which is a second part of the secret). Similarly to the first share, the second share may be a second single point from the same Euclidean plane (e.g., in the form of $(x_1, y_1)$).

In the first exemplary embodiment, the message, the message authenticator (e.g., MAC), and the second ('activating') share are received by receiver 50 and are processed within the receiver. The receiver 50 uses the second ('activating') share (e.g., $(x_1, y_1)$) and the stored first share (e.g., $(x_0, y_0)$) to reconstruct (or recover) the key (i.e., secret). The receiver 50 then uses the reconstructed key to generate the message authenticator (e.g., MAC). If the message authenticator (e.g., MAC) computed at the receiver 50 is the same as the message authenticator sent from the message source 40, the message is deemed authentic, if the message authenticators are not the same, the message is rejected.

Recovery of the key is achieved by constructing a polynomial utilizing the first and the second shares; the y-intercept of the constructed polynomial being the key. For example, given $(x_0, y_0)$ and $(x_1, y_1)$, the key is constructed by computing the value of S in the given finite field, where:

$$S=f(0)=y_0-((y_1-y_0)/(x_1-x_0))*(x_0)$$

FIG. 2(a) illustrates a graphical representation of the first exemplary embodiment of the present invention showing exemplary shares $(x_0, y_0)$ and $(x_1, y_1)$, and a line formed thereby which crosses the Y-axis at a specific point (which is the key). For demonstrative purposes the plot in FIG. 2(a) is obtained using real numbers, and not modular arithmetic.

Such an approach as the one described above with reference to the first exemplary embodiment permits more than one message source 40 to share the stored (first) share $(x_0, y_0)$ which is stored at the receiver 50. Each message source 40 would then be free to choose its own 'activating' (second) share (i.e., $(x_1, y_1)$), thereby defining a broad range of secrets. The probability of constructing polynomials with identical y-intercepts (i.e., identical keys) is low. However, the range of possible second ('activating') shares could be allocated such that each service provider has a unique and non-overlapping range (see FIG. 2(b)).

To consider an example in accordance with the first exemplary embodiment of the present invention, assume points $(x_0, y_0)=(17,15)$ and $(x_1, y_1)=(5,10)$ and $p=23$. The first-degree polynomial:

$$f(x)=a_1x+a_0 \pmod{23}$$

passing through $(x_0, y_0)$ and $(x_1, y_1)$ can be constructed by solving:

$$a_1(17)+a_0=15 \pmod{23} \text{ and}$$

$$a_1(5)+a_0=10 \pmod{23}$$

The solution $(a_1, a_0)=(10,6)$ gives the polynomial:

$$f(x)=10x+6 \pmod{23}$$

The value of the secret S can be discovered by computing f(0):

$$S=f(0)=6 \pmod{23}$$

Thus, according to the above example the value of the secret, and thus the key, would be 6 (mod 23). Of course the value of this secret will change with each different value of $(x_1, y_1)$.

Figure 3:
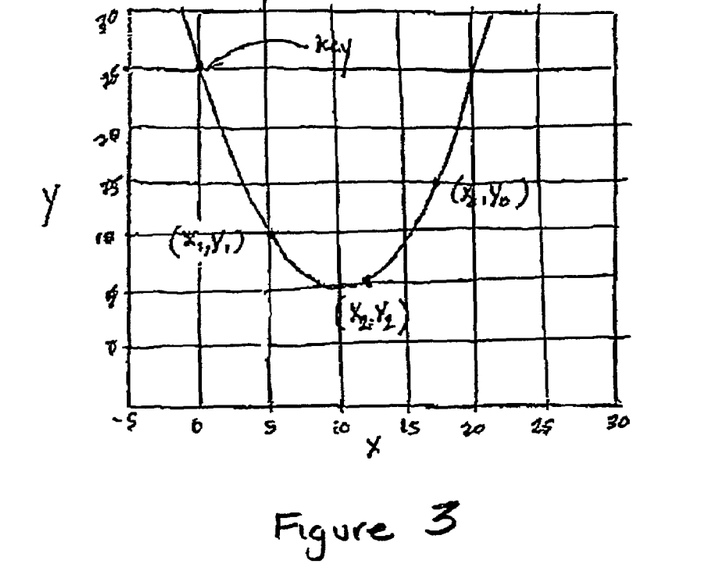
FIG. 3 is a graphical representation of the determination of the authentication key in accordance with a second exemplary embodiment of the present invention.

FIG. 3 illustrates a key recovery scheme according to a second exemplary embodiment of the present invention that utilizes three shares (as opposed to the two shares of the first exemplary embodiment). In the second exemplary embodiment, recovery of the key is achieved by constructing a second-degree polynomial (i.e., parabolic curve) utilizing first, second and third shares (e.g., $(x_0,y_0)$, $(x_1,y_1)$, $(x_2,y_2)$); the y-intercept of the constructed second-degree polynomial being the key.

To consider an example in accordance with the second exemplary embodiment of the present invention, assume points $(x_0, y_0)=(17, 15)$, $(x_1, y_1)=(5, 10)$, and $(x_2, y_2)=(12, 6)$, and $p=23$. The second-degree polynomial:

$$f(x)=a_2x^2+a_1x+a_0 \pmod{23}$$

passing through $(x_0, y_0)$, $(x_1, y_1)$ and $(x_2, y_2)$ can be constructed by solving:

$$a_2*(17^2)+a_1*(17)+a_0=15 \pmod{23}$$

$$a_2*(12^2)+a_1*(12)+a_0=6 \pmod{23} \text{ and}$$

$$a_2*(5^2)+a_1*(5)+a_0=10 \pmod{23}$$

The solution $(a_2, a_1, a_0)=(10, 20, 5)$ gives the polynomial:

$$f(x)=10x^2+20x+5 \pmod{23}$$

The value of the secret S can be discovered by computing f(0):

$$S=f(0)=5 \pmod{23}$$

As shown in FIG. 3, the first, second and third shares may be expressed as points on a Euclidean plane. For demonstrative purposes the plot in FIG. 4 is obtained using real numbers, and not modular arithmetic.

Figure 4:
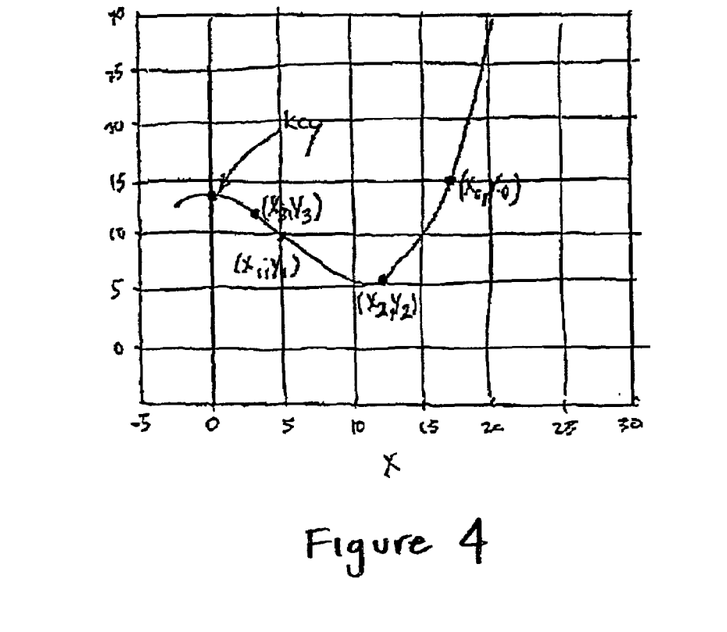
FIG. 4 is a graphical representation of the determination of the authentication key in accordance with a third exemplary embodiment of the present invention.

FIG. 4 illustrates a key recovery scheme according to a third exemplary embodiment of the present invention that utilizes four shares. In the third exemplary embodiment, recovery of the key is achieved by constructing a third-degree polynomial (i.e., curve) utilizing first, second, third and fourth shares (e.g., $(x_0,y_0)$, $(x_1,y_1)$, $(x_2,y_2)$, $(x_3,y_3)$); the y-intercept of the constructed third-degree polynomial being the key.

To consider an example in accordance with the third exemplary embodiment of the present invention, assume points $(x_0, y_0)=(17, 15)$, $(x_1, y_1)=(5, 10)$, $(x_2, y_2)=(12, 6)$ and $(x_3, y_3)=(3, 12)$ and $p=23$. The third-degree polynomial:

$$f(x)=a_3x^3+a_2x^2+a_1x+a_0 \pmod{23}$$

passing through $(x_0, y_0)$, $(x_1, y_1)$, $(x_2, y_2)$ and $(x_3, y_3)$ can be constructed by solving:

$$a_3*(17^3)+a_2*(17^2)+a_1*(17)+a_0=15 \pmod{23}$$

$$a_3*(12^3)+a_2*(12^2)+a_1*(12)+a_0=6 \pmod{23}$$

$$a_3*(5^3)+a_2*(5^2)+a_1*(5)+a_0=10 \pmod{23}$$

$$a_3*(3^3)+a_2*(3^2)+a_1*(3)+a_0=12 \pmod{23}$$

The solution $(a_3, a_2, a_1, a_0)=(18, 19, 0, 22)$ gives the polynomial:

$$f(x)=18x^3+19x^2+0x+22 \pmod{23}$$

The value of the secret S can be discovered by computing f(0):

$$S=f(0)=22 \pmod{23}$$

As shown in FIG. 4, the first, second, third and fourth shares may be expressed as points on a Euclidean plane. For demonstrative purposes the plot in FIG. 4 is obtained using real numbers, and not modular arithmetic.

Multiple shares may also be used to build a convenient key transport scheme in a communications network. Code authentication, an important issue in digital networks, may be used as a case study. In the future, sophisticated home entertainment devices handling audio/video data will receive software for various applications via digital distribution networks (e.g., satellite, cable, terrestrial, Internet). Identification of the source of this code is an essential requirement for both the service providers delivering the content and the manufacturer of the devices utilizing the content. The service providers would like to have assurance that their application is received an used only by authorized devices. The device manufacturers would, in turn, be concerned about unauthorized services using their devices. Suppose in a given broadcasting system different groups of devices are to be authorized in different ways. The example given below will discuss how prepositioned secret sharing may be used to establish the required key hierarchy.

Consider a broadcast system with three (3) different authentication levels for code authentication:

(1) Level 1 Receiver—all the receivers in the broadcast 'region' are assigned one common share (i.e., a share common to all receivers in the region);
(2) Level 2 Receiver—all the receivers in a specified group are assigned an additional common share (i.e., another share common to all receivers in the specified group); and
(3) Level 3 Receiver—each receiver is assigned a unique additional share.

The above-described receivers may be used in conjunction with an 'activating' share to authenticate certain messages. Since the Level 1 Receiver includes only one share, while the Level 2 Receiver includes 2 shares, and the Level 3 Receiver includes 3 shares, each receiver will provide different sets of keys. Thus, all receivers in the broadcast region (i.e., Level 1 Receivers) will have the ability to receive and authenticate general messages, but only Level 2 Receivers will have the ability to receive and authenticate some additional messages, and only Level 3 Receivers will have the ability to receive and authenticate certain other additional messages. It will be noted that the shares which are placed in the Level 1–3 receivers comprise 'prepositioned' information which may be used in conjunction with an 'activating' share to compute a secret (e.g., the key).

Figure 5:
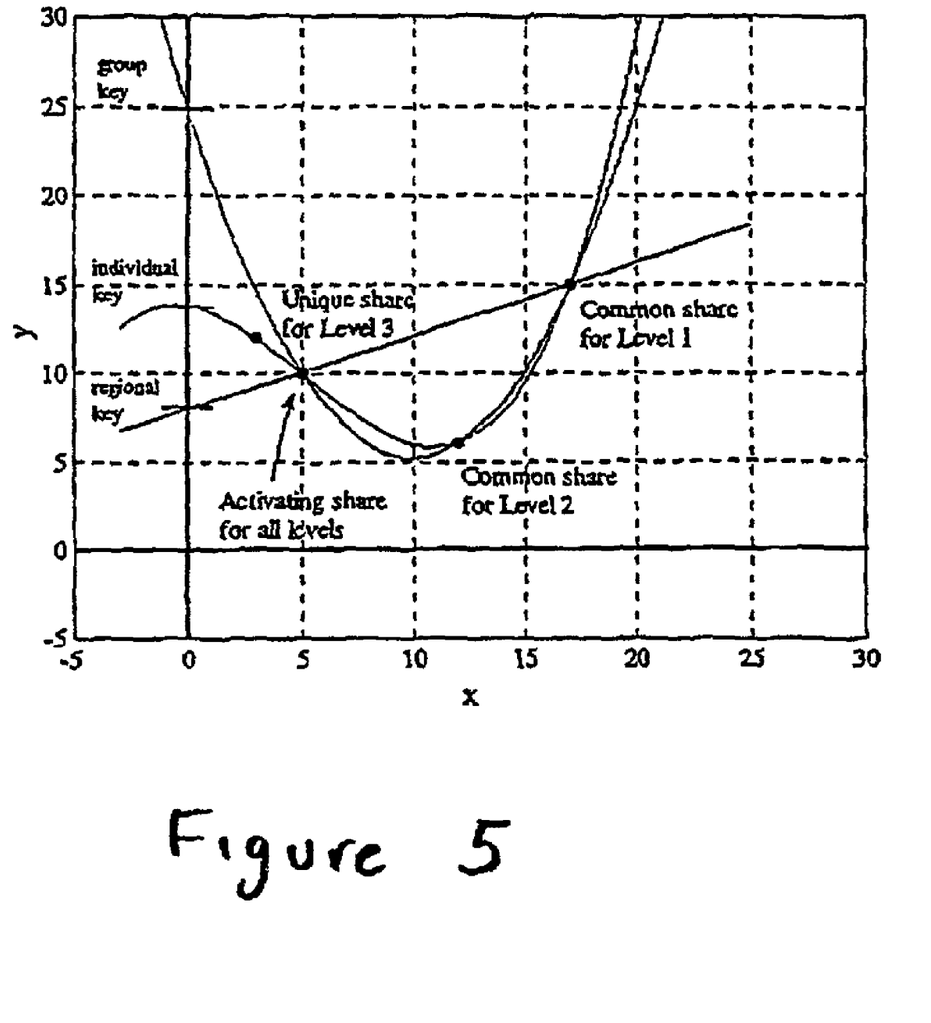
FIG. 5 is a graphical representation of the determination of a plurality of authentication keys in accordance with the first through third exemplary embodiments of the present invention.

FIG. 5 shows how the multiple share scheme would be constructed using the Euclidean plane. As will be understood, the three different authentication levels correspond to the three y-intercepts (i.e., "regional key", "group key", "individual key"). The first-degree polynomial (corresponding to the Level 1 or 'regional' authorization) comprises a line passing through an 'activating share' and a Level 1 common share. The second-degree polynomial (corresponding to the Level 2 or 'group' authorization) comprises a parabola passing through the 'activating' share, the Level 1 common share, and a Level 2 share. The third-degree polynomial (corresponding to the Level 3 or 'individual' authorization) comprises a curve passing through the 'activating share', the Level 1 common share, the Level 2 share, and a Level 3 share. In the above example, it will be noted that the 'activating' share is used to compute each of the different keys (i.e., individual, group and regional). For demonstrative purposes the plot in FIG. 5 is obtained using real numbers, and not modular arithmetic.

Using the above example, the table below describes the relationship between the shares and the different authorization levels:

| Point | First Degree Level 1 | Second Degree Level 2 | Third Degree Level 3 |
|---|---|---|---|
| Activating Share = (5, 10) | Yes | Yes | Yes |
| Level 1 common share = (17, 15) | Yes | Yes | Yes |
| Level 2 share = (12, 6) | | Yes | Yes |
| Level 3 share = (3, 12) | | | Yes |

Although the above-described method and apparatus have been described in the context of a message authentication system for delivering authentic messages between users, the principles of the present invention may also be applied to a method and apparatus for providing conditional access to multimedia content.

Some of the advantages of the above-described method and apparatus include:

(a) Reduction in computational requirements for the receiver in key recovery (i.e., for each key, only a simple operation is performed). This is in contrast to RSA decryption which involves modular exponentiation.
(b) Security is 'perfect.' In other words, given the activating share, all values of the secret remain equally probable. For higher degree polynomials, the task of determining the secret given the activating share becomes even more difficult.
(c) For a given set of 'propositioned' information shared between a sender and receiver, different keys can be easily derived and frequently used (i.e., by changing the 'activating' share).
(d) Different authorization levels can be defined by assigning different shares to the respective receivers.
(e) Security does not rely on unproven mathematical assumptions (i.e., the security of RSA is based on the difficulty of the integer factorization problem).

The above-described scheme effectively combines the advantages of symmetric and public key systems. The 'prepositioned' information can be considered to be the private key of the receiver. The symmetric key to be constructed is determined by the public information sent as part of the ECM. As the keys are not generated at the message source, no additional cipher is needed to protect them in distribution.

The effectiveness of the above-described schemes can be increased in various ways including:

(1) Defining the key as a function of the shared secret: In general, the key can be generated by evaluating a predefined function at the value of the secret. For example, if the shared secret (e.g., Y-intercept of the function f(x)) were the real number 7, the key might be defined as the square root of 7. In this way, even if one were to discover the secret, one does not necessarily have the ability to compute the key. Alternatively, any other definition can be used once the coefficients of the polynomial are obtained. For practical purposes, the function may need to have an entropy preserving property (i.e, entropy (secret)=entropy [f(secret)].
(2) Making the degree of the polynomial function (and thus the number of shares needed to discover the secret) a time-dependent secret system parameter: e.g., the degree of the polynomial f(x) defining the secret would change from day-to-day, hour-to-hour, etc. Cryptanalysis would become a more demanding task for adversaries because they would have to first determine the degree of the polynomial.
(3) Masking the activating share before transmission: The activating share transmitted with the message can then be unmasked by the receiver in a predefined process. An example of masking would be using a hash value of the activating share for authentication, but transmitting the activating share instead. Then, the receiver would perform hashing to determine the actual value.
(4) Adding redundant activating shares: Additional activating shares transmitted with the actual activating share are filtered out by the receiver in a predefined process.

Any combination of the above-referenced improvements will serve to hide the real value of the activating share in transmission, and introduce an additional level of security for the message.

Although the above discussion primarily centers in the use of a MAC as the message authenticator, those of ordinary skill in the art will recognize that other message authentication methods may be used without departing from the scope of the present invention (e.g., message encryption; See FIG. 8 of the present application and description).

Although the invention has been described in terms of a secret sharing scheme which may use first, second and third degree polynomial equations in forming a secret, it will be understood by those skilled in the art that any degree polynomial equation (e.g., fourth degree, fifth degree, etc.) may be used. In fact, higher degree polynomial functions will be preferred in that they provide additional security over lower order polynomial functions due to the increased number of shares which must be estimated. Furthermore, although the above description focuses on a system with a single smart card (e.g., smart card 42), it will be understood by those skilled in the art that multiple smart cards may be used, each smart card having one or more share values stored therein.

What is claimed is:

1. A method for authenticating a message, said method comprising:
   receiving at a device data representative of the message and a first share transmitted with the message;
   constructing a key using said first share and at least two additional shares, said at least two additional shares being stored at said device, said first and at least two additional shares constituting a subset of a total number of shares, and representing a threshold number of shares necessary to construct said key; and
   authenticating the message using said constructed key.

2. The method of claim 1 wherein said first, second and third shares are points on a Euclidean plane.

3. The method of claim 1, wherein the step of authenticating the message comprises authenticating the message using a Message Authentication Code.

4. The method of claim 1, wherein the step of authenticating the message comprises authenticating the message using a decryption key.

5. A method for providing authentication of a message, said method comprising:
   receiving a message authenticator and said message at a device;
   receiving at said device data representative of a first share transmitted with the message;
   constructing a key using said first share and second and third shares, said second and third shares being stored at said device, said first, second and third shares constituting a subset of a total number of shares, and representing a threshold number of shares necessary to construct said key; and
   authenticating said message using said constructed key and said message authenticator, wherein the step of constructing said key comprises calculating the Y-intercept of the curve formed on said Euclidean plane by said first, second and third shares.

6. The method of claim 5, wherein the message authenticator comprises a Message Authentication Code.

7. A system for authenticating a message sent from a first device to a second device, said second device performing the steps of:
   receiving a message and a message authenticator;
   receiving data representative of a first share transmitted with the message;
   constructing a key using said first share and second and third shares, said second and third shares being stored in said second device, said first, second and third shares constituting a subset of a total number of shares, and representing a threshold number of shares necessary to construct said key; and
   authenticating said message using said constructed key and said message authenticator, wherein the step of constructing said key comprises calculating the Y-intercept of the curve formed on said Euclidean plane by said first, second and third shares.

8. A message authentication system comprising:
   at least one message source; and,
   at least one message receiver for receiving from the at least one message source a message, a message authenticator and a first share transmitted with the message;
   wherein said at least one message receiver includes second and third shares stored therein for authenticating the message, said second and third shares being used in conjunction with said first share to authenticate said message, said first, second and third shares constituting a subset of a total number of shares, and representing a threshold number of shares necessary to authenticate said message.

9. The method of claim 1, wherein said first share and said at least two additional shares are points on at least a second degree polynomial function.

10. The method of claim 1, wherein the at least two additional shares comprise at least three additional shares, such that said first share and said at least three additional shares are points on at least a third degree polynomial function.

11. The method of claim 1, wherein the key comprises a secret value computed from the first and the at least two additional shares.

12. The method of claim 1, wherein the key comprises a function of a secret value computed from the first and the at least two additional shares.

13. The method of claim 1, wherein the first share and the at least two additional shares comprise points on a polynomial function.

14. The method of claim 13, wherein the degree of the polynomial function is altered periodically.

15. The method, of claim 1, comprising the further step of:
   masking the first share before receiving the first share in the device.

16. The method of claim 15, comprising the further step of:
   computing the first share from the masked version of the first share.

17. The method of claim 1, comprising the further step of:
   transmitting a first sham and at least one redundant share.

18. The method of claim 17, comprising the further step of:
   filtering out said at least one redundant share after receiving said first share.

19. A method for operating a message authentication system comprising the steps of:
   transmitting a message, a message authenticator and a first share from a transmitter station to a receiver station;

receiving at the receiver station said message, said message authenticator and said first share transmitted with said message;

constructing a key using said first share and at least two additional shares, said at least two additional shares being stored at the receiver station, said first and at least two additional shares constituting a subset of a total number of shares, and representing a threshold number of shares necessary to construct said key; and authenticating the message using said constructed key and said message authenticator.

20. A message authentication system comprising:

a transmitter; and, a receiver for receiving from the transmitter a message, a message authenticator and a first share transmitted with the message, wherein the receiver includes second and third shares stored therein for authenticating the message, said second and third shares being used in conjunction with said first share to authenticate said message, said first, second and third shares constituting a subset of a total number of shares, and representing a threshold number of shares necessary to authenticate said message.

* * * * *